(12) United States Patent
Dudley

(10) Patent No.: US 8,185,587 B2
(45) Date of Patent: May 22, 2012

(54) CAPTURING, PROCESSING, MANAGING, AND REPORTING EVENTS OF INTEREST IN VIRTUAL COLLABORATION SPACES

(75) Inventor: Mark F. Dudley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 538 days.

(21) Appl. No.: 12/047,426

(22) Filed: Mar. 13, 2008

(65) Prior Publication Data

US 2009/0234921 A1    Sep. 17, 2009

(51) Int. Cl.
G06F 15/16    (2006.01)

(52) U.S. Cl. ........ 709/204; 709/224; 709/225; 709/226; 715/700; 345/1.1

(58) Field of Classification Search .................. 709/204, 709/224–226
See application file for complete search history.

(56) References Cited

U.S. PATENT DOCUMENTS

| | | | |
|---|---|---|---|
| 6,032,004 A | 2/2000 | Mirabella, Jr. et al. | |
| 6,629,129 B1* | 9/2003 | Bookspan et al. | 709/204 |
| 7,111,044 B2* | 9/2006 | Lee | 709/204 |
| 7,233,933 B2 | 6/2007 | Horvitz et al. | 706/21 |
| 7,299,405 B1* | 11/2007 | Lee et al. | 715/700 |
| 7,401,294 B2* | 7/2008 | Chang et al. | 715/733 |
| 7,509,388 B2* | 3/2009 | Allen et al. | 709/207 |
| 7,613,772 B2* | 11/2009 | Bartram et al. | 709/205 |
| 7,636,752 B2* | 12/2009 | Madsen et al. | 709/204 |
| 7,636,892 B2* | 12/2009 | Elie | 715/751 |
| 7,694,212 B2* | 4/2010 | Fikes et al. | 715/200 |
| 2002/0156601 A1* | 10/2002 | Tu et al. | 702/188 |
| 2005/0032527 A1* | 2/2005 | Sheha et al. | 455/456.1 |
| 2005/0060371 A1* | 3/2005 | Cohen et al. | 709/205 |
| 2005/0273600 A1* | 12/2005 | Seeman | 713/160 |
| 2006/0224587 A1* | 10/2006 | Zamir et al. | 707/7 |
| 2006/0224608 A1* | 10/2006 | Zamir et al. | 707/101 |
| 2007/0005752 A1* | 1/2007 | Chawla et al. | 709/224 |
| 2007/0037599 A1* | 2/2007 | Tillet et al. | 455/521 |
| 2007/0064899 A1* | 3/2007 | Boss et al. | 379/201.01 |
| 2007/0100986 A1* | 5/2007 | Bagley et al. | 709/224 |
| 2007/0136423 A1* | 6/2007 | Gilmore et al. | 709/204 |
| 2007/0208806 A1 | 9/2007 | Mordecai et al. | |
| 2008/0092181 A1* | 4/2008 | Britt | 725/87 |
| 2008/0250109 A1* | 10/2008 | Jakobson | 709/206 |
| 2009/0006982 A1* | 1/2009 | Curtis et al. | 715/753 |
| 2009/0037534 A1* | 2/2009 | Castro et al. | 709/205 |
| 2009/0055483 A1* | 2/2009 | Madan et al. | 709/206 |

(Continued)

FOREIGN PATENT DOCUMENTS

EP    1351446    * 10/2003

*Primary Examiner* — Backhean Tiv
(74) *Attorney, Agent, or Firm* — Gibb & Riley, LLC

(57) ABSTRACT

A method of monitoring a collaboration space receives an identification of a computerized collaboration space that a user desires to monitor. The method receives, from the user, an identification of events of interest with respect to the collaboration space. The items within the collaboration space as well as the collaborator interaction with the collaboration space are monitored to identify occurrences of the events of interest, and the method records such occurrences of the events of interest. The method can simply output reports that summarize the occurrences of the events of interest. In addition, the method can receive, from a user, one or more queries regarding the occurrences of the events. In response to any such query, the method searches the stored occurrences of the events to produce a response to the query, and outputs the response to the query.

12 Claims, 3 Drawing Sheets

U.S. PATENT DOCUMENTS

2009/0112608 A1* 4/2009 Abu-Hakima et al. ........... 705/1
2009/0119373 A1* 5/2009 Denner et al. ................ 709/206
2009/0138806 A1* 5/2009 Galvin et al. ................ 715/753
2009/0234921 A1* 9/2009 Dudley ........................ 709/205
2010/0094706 A1* 4/2010 Gabai et al. ................ 705/14.53

* cited by examiner

Identify Events of Interest

Select a Scheduled Meeting:

[Select... ▼]
Select...
ICPS Brainstorming, 10/8/07 at 12:30 pm
XGS HFS Demonstration, 10/6/07 at 9:00am ☐ Number of participants
☑ Length of times each participant attends the session
☐ Number of times each participant contributes information Specify the beginning and end time for recording:

Start: [     ]  End: [     ]

*FIG. 3*

Identify Events of Interest

Select a Scheduled Meeting:

[ICPS Brainstorming, 10/8/07 at 12:30 pm ▼]

Specify the events you would like to record:
☐ Identity of participants
☐ Number of participants
☑ Length of times each participant attends the session
☐ Number of times each participant contributes information Specify the beginning and end time for recording:

Start: [     ]  End: [     ]

*FIG. 4*

Identify Events of Interest

Select a Scheduled Meeting:

[ICPS Brainstorming, 10/8/07 at 12:30 pm ▼]

Specify the events you would like to record:
☐ Identity of participants
☐ Number of participants
☑ Length of times each participant attends the session
☐ Number of times each participant contributes information Specify the beginning and end time for recording:

Start: [12:30pm]  End: [1:30pm]

*FIG. 5*

CAPTURING, PROCESSING, MANAGING, AND REPORTING EVENTS OF INTEREST IN VIRTUAL COLLABORATION SPACES

BACKGROUND

Embodiments herein generally relate to monitoring a collaboration space and more particularly to monitoring items within the collaboration space as well as collaborator interaction based upon the events of interest to provide, for example, an automated capture of meeting events in a virtual meeting space.

Virtual collaboration spaces immerse a participant in a rich, three-dimensional environment where events occur in real time and closely resemble reality. These collaboration spaces utilize video, audio, application sharing, and other tools to provide an alternative to a "live" meeting and provide additional capabilities above and beyond the current line of widespread web meeting tools like WebEx® available from Cisco Systems, Inc., (located in San Jose, Calif.), or Live Meeting® available from Microsoft Corporation (located in Redmond, Wash). Examples of these virtual collaboration applications range from internally focused initiatives like Sun Microsystems' MPK20 (located in Santa Clara, Calif.) to public offerings like the SmartMeeting platform from Convenos (located in Scotts Valley, Calif.), and GoToMeeting® available from Citrix Online (located in Goleta, Calif.).

As described in greater detail in U.S. Patent Publication Number 2007/0208806 (the complete disclosure of which is incorporated herein by reference) collaboration software, sometimes referred to as "groupware" is designed to allow multiple network users to work on a single project together from separate workstations. One version of such software is "NOTES®" which is a registered trademark and product of Lotus Development Corporation, Cambridge, Mass, USA. Another is "NETMEETING®" which is a registered trademark and product of Microsoft Corporation, Redmond, Wash, USA.

The goal of these products is to allow conferencing between multiple network clients, and collaboration among those clients in which they interact to manipulate a target such as a document or "whiteboard." The network interface may include a meeting creation tool that allows a network client to create a virtual meeting space by which the participants to a collaboration (collaborators) are selected. Each of the participants has a set of access privileges.

BRIEF SUMMARY OF THE INVENTION

Embodiments herein comprise methods, services, and computer program products of monitoring such a collaboration space. Methods herein receive an identification of a computerized collaboration space that a user desires to monitor. With embodiments herein, the user can also identify a time period for the monitoring to occur.

For purposes herein, a collaboration space comprises a virtual space accessible only through a computerized device. The collaboration space therefore comprises at least one site within a computerized network accessible by a plurality of computerized devices. The collaboration space is one that is shared by at least two collaborators who interact with the collaboration space to view, add, remove, revise, etc. items maintained within the collaboration space. Such items can comprise documents, graphic items, image items, video items, and/or audio items, etc.

The methods herein also receive, from the user, an identification of events of interest with respect to the collaboration space. The events of interest can comprise the number and identity of collaborators attending a virtual meeting through the collaboration space. A virtual meeting comprises at least two of the collaborators simultaneously accessing the collaboration space and interacting with other collaborators through the collaboration space, using different computerized devices.

In addition, the events of interest can comprise the number of times a collaborator interacts with the collaboration space, as well as the times and dates of when the collaborator begins using and stops using the collaboration space. Further, the events of interest can comprise topical subjects of the collaborator interaction.

The items within the collaboration space as well as the collaborator interaction with the collaboration space are monitored to identify occurrences of the events of interest and the methods herein record such occurrences of the events of interest.

The methods herein can simply output reports that summarize the occurrences of the events of interest. In addition, the methods herein can receive, from a user, one or more queries regarding the occurrences of the events. In response to any such query, the method searches the stored occurrences of the events to produce a response to the query; and outputs the response to the query.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 3 is a schematic representation of a graphic user interface according to embodiments herein;

FIG. 4 is a schematic representation of a graphic user interface according to embodiments herein; and FIG. 5 is a schematic representation of a graphic user interface according to embodiments herein.

DETAILED DESCRIPTION

As virtual collaboration applications more closely resemble live interactions through the use of immersive environments, they generate an immense amount of data which needs to be captured, processed, managed, and reported on. The reports that can be generated from the data that is captured during a meeting or collaboration event in a virtual world would be of interest to the participants in the event (in the form of minutes or notes), management, human resources, or other people with interest in the topic that was discussed during the event or the collaborators taking part in the discussion.

Given the simulation of reality that a virtual collaboration space exhibits and the opportunity it presents for the collection and aggregation of data, the embodiments described below listen for "events of interest" in the virtual space and record them in a data store. The system, service, and method herein allow a collaborator or other interested party to determine what an event of interest is, and apply the event of interest to the virtual space for the length of the collaboration. The embodiments herein provide a mechanism for an interested party to access the data store, query it, and construct a report chronicling the activities during the meeting or collaboration.

Figure 1:
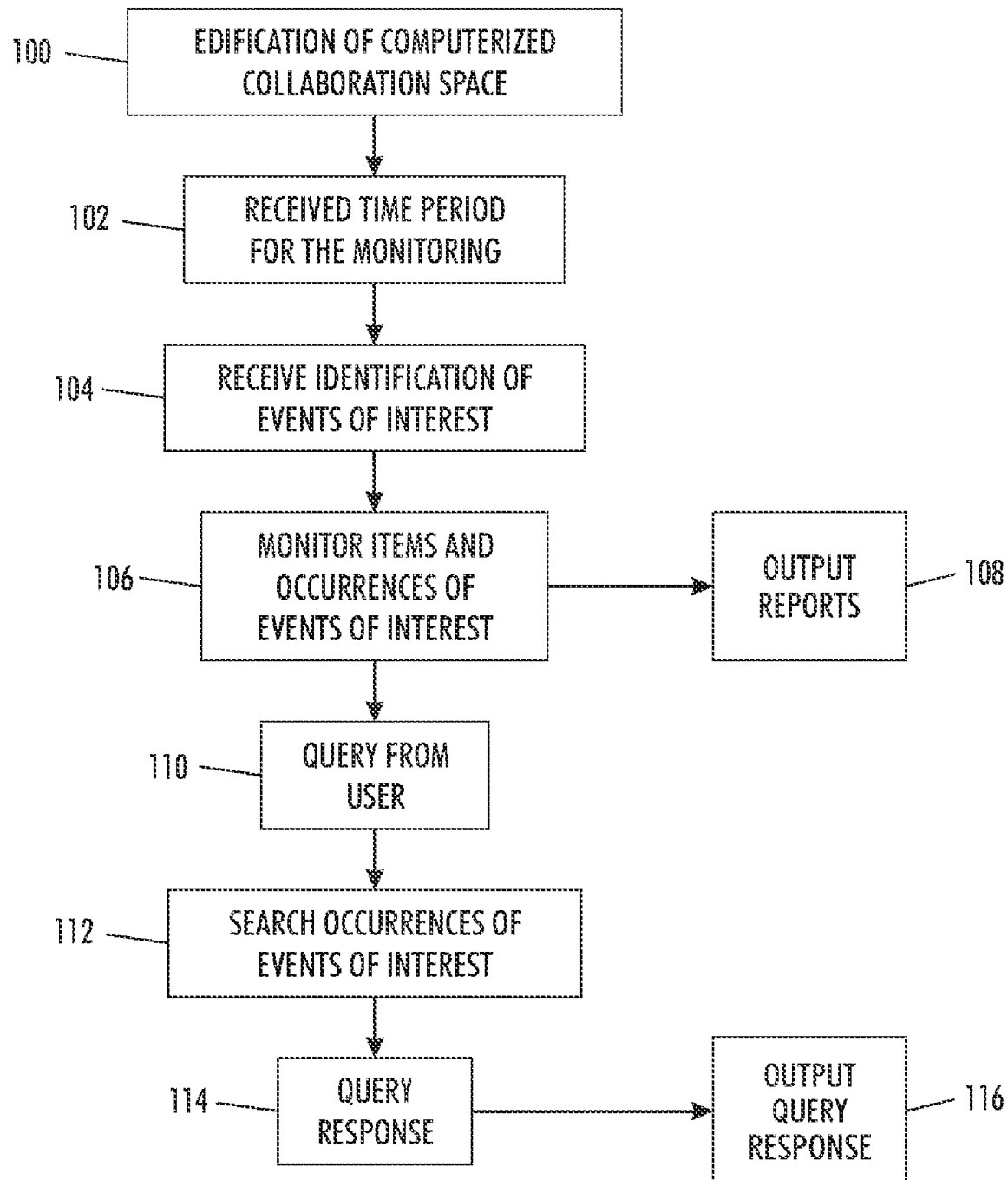
FIG. 1 is a flow diagram illustrating an embodiment herein.

More specifically, as shown in flowchart form in FIG. 1, embodiments herein comprise methods of monitoring a collaboration space. In item 100, the embodiments herein receive an identification of a computerized collaboration space that a user desires to monitor. With embodiments herein, as shown in item 102, the user can also identify a time period for the monitoring to occur.

Figure 2:
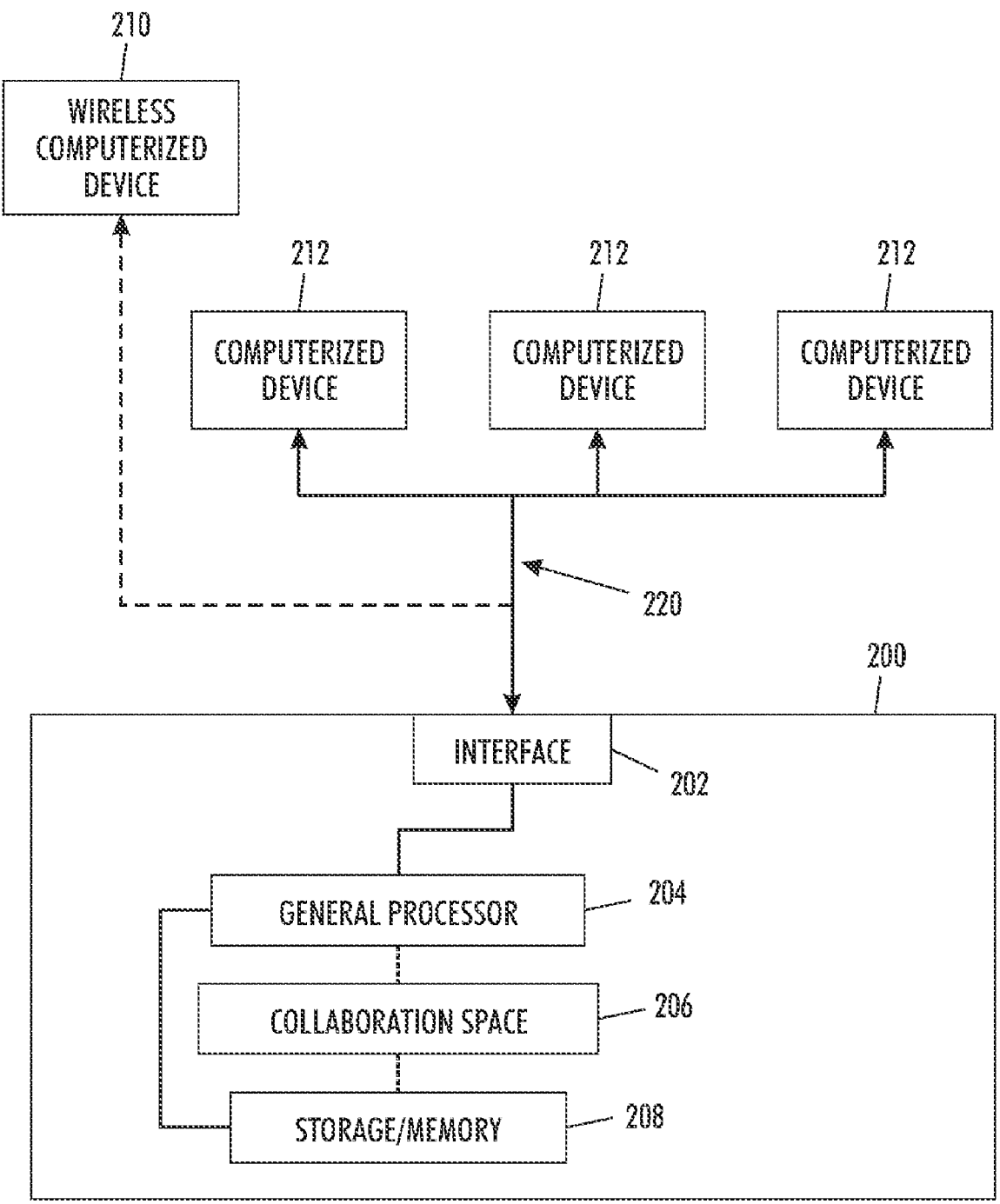
FIG. 2 is a schematic representation of a system according to embodiment herein.

With reference to FIG. 2, a collaboration space 206 comprises a virtual space accessible only through wired or wireless computerized devices 210, 212. The collaboration space 206 therefore comprises at least one site that can be maintained on a server computer 200 within a computerized network 220 that is accessible by a plurality of computerized devices 212. Collaboration spaces can comprise e-mail, instant messages, chat, teleconference, video teleconferencing, e-meeting communications, co-browsing, etc.

The server computer 200 includes an interface 202 to the network 220, a processor 204 as well as electronic storage and memory 208. The processor 204 stores the collaboration space within the memory 208 and operates with various software programs to allow the computerized devices 210, 212 to access the collaboration space 206. Note that the server computer 200 can also serve as a collaborator's computer and can access the collaboration space 206 just as easily as any of the other computerized devices 210, 212.

The collaboration space 206 is one that is shared by at least two collaborators who interact through their computerized devices 210, 212 with the collaboration space 206 to view, add, remove, revise, etc. items maintained within the collaboration space 206. Such items can comprise documents, graphic items, image items, video items, and/or audio items, etc. which can be permanently or temporarily stored in the memory 208.

Various computerized devices are mentioned above. Computers that include input/output devices, memories, processors, etc. are readily available devices produced by manufactures such as International Business Machines Corporation, Armonk N.Y., USA and Apple Computer Co., Cupertino Calif., USA. Such computers commonly include graphic user interfaces, input/output devices, power supplies, processors, electronic storage memories, wiring, etc., the details of which are omitted herefrom to allow the reader to focus on the salient aspects of the embodiments described herein. Similarly, scanners, copiers, printers, and other similar peripheral equipment are available from Xerox Corporation, Norwalk, Conn., USA, and the details of such devices are not discussed herein for purposes of brevity and reader focus.

Referring again to FIG. 1, the embodiments herein also receive, in item 104, from the user, an identification of events of interest with respect to the collaboration space 206. The events of interest can comprise the number and identity of collaborators attending a virtual meeting through the collaboration space 206. A virtual meeting comprises at least two of the collaborators simultaneously accessing the collaboration space 206 and interacting with other collaborators through the collaboration space 206, using different computerized devices 212.

In addition, the events of interest can comprise the number of times a collaborator interacts with the collaboration space 206, as well as the times and dates of when the collaborator begins using and stops using the collaboration space 206. Further, the events of interest can comprise topical subjects of the collaborator interaction.

In item 106, the items within the collaboration space 206 as well as the collaborator interaction with the collaboration space 206 are monitored to identify occurrences of the events of interest and the methods herein record such occurrences of the events of interest. Details regarding methods, systems, and media for managing collaboration spaces is disclosed in US Patent Publication Number 2007/0136423 (the complete disclosure of which is incorporated herein by reference) and the details relating to such management are omitted here from to focus the reader on the salient aspects of the present disclosure.

The methods herein can simply output reports that summarize the occurrences of the events of interest, as shown in item 108. In addition, the methods herein can receive, from a user, one or more queries regarding the occurrences of the events (item 110). In response to any such query, the method searches the stored occurrences of the events (item 112) to produce a response to the query (item 114); and outputs the response to the query (item 116).

As in any meeting or interaction there is a need to chronicle the activities that transpire to be presented as minutes or notes of the meeting or collaboration. Given the unique nature of virtual worlds, there is an opportunity to not only specify the activities and events of interest that would be of the most interest to an individual, but these can be collected and aggregated in an automated fashion with the system and method described above. This eliminates variability in how these events are recalled and will provide for a more efficient means of processing this data and reporting on it.

A non-limiting example of how the embodiments herein can be implemented is discussed below with respect to FIG. 3-5. In this example, a use case is utilized to capture, process, manage, and reports events of interest. This use case begins when the collaborator actor accesses the system to configure the capture of events of interest at a scheduled virtual collaboration event.

First, the collaborator specifies the event that they would like to record the events of interest in using, for example, a graphic user interface, for example, similar to the one shown in FIG. 3. Thus, for example, the user can select a collaboration or meeting from a pulldown menu 300.

Secondly, the collaborator specifies the "event(s) of interest" that they would like to have collected during the collaboration. This event of interest could be, for example, one or more of the following: the number and identity of the collaborators attending the meeting; the number of times a collaborator interacts with others in the space; the time a collaborator enters and exits the virtual space; the content of the interaction of the collaborator; etc. A selection of the events of interest could be performed by checking box entries 400 within a graphic user interface, similar to the one shown in FIG. 4.

Thirdly, the collaborator can specify when the collection of these events should begin by inputting dates and times into entry boxes 500 using a graphic user interface, for example, similar to the one shown in FIG. 5. Fourthly, once the data is collected it will be aggregated in a data store 208 where it will be made accessible for the construction of reports chronicling the collaboration or meeting. This use case illustrates only a subset of the events that may be of interest and the use of the aggregated data and those ordinarily skilled in the art understand that the embodiments herein are not limited to these examples, but instead are applicable to all types of collaboration spaces which a user desires to monitor.

Thus, there is a large amount of data that may be lost during any collaboration event, and recalling it is not always easy. The embodiments herein allow for events to be captured automatically and stored for further processing. The embodiments herein allow a user to specify what events would be of interest to capture and automatically store the events of interest in a data store for easy retrieval. The embodiments herein are especially useful for individuals and entities looking for a time-efficient way of recalling and presenting meeting events. The embodiments herein also serve as a way to monitor interactions for educational purposes.

A printer or graphic user interface can be used to produce the output of embodiments herein. The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Norwalk, Conn., USA. Such printers commonly include input/output, power supplies, processors, media movement devices, marking devices etc., the details of which are omitted herefrom to allow the reader to focus on the salient aspects of the embodiments described herein.

All foregoing embodiments are specifically applicable to electrostatographic and/or xerographic machines and/or processes as well as to software programs stored on the electronic memory (computer usable data carrier) 208 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
    receiving an identification of a computerized collaboration space being monitored, wherein said collaboration space comprises at least one site within a computerized network accessible by a plurality of computerized devices;
    receiving a user-selectable identification of events of interest with respect to said collaboration space;
    automatically monitoring collaborator interaction with said collaboration space to identify occurrences of said events of interest using at least one of said computerized devices;
    automatically recording a chronicle of activities that transpire within said collaboration space to produce at least one report of minutes of at least one meeting occurring within said collaboration space based on said occurrences of said events of interest using at least one of said computerized devices, said report of minutes summarizing occurrences of said events of interest; and
    outputting said of report of minutes,
    wherein said events of interest comprise:
        an identity of collaborators that interact with said collaboration space;
        times and dates of when said collaborators begin using and stop using said collaboration space; and
        topical subjects of collaborator interaction.

2. The method according to claim 1, further comprising identifying a time period for said monitoring to occur.

3. The method according to claim 1, wherein said events of interest comprise a number and identity of collaborators attending a virtual meeting through said collaboration space, wherein said virtual meeting comprises at least two of said collaborators simultaneously accessing said collaboration space and interacting with other collaborators through said collaboration space, using different computerized devices.

4. A method comprising:
    receiving an identification of a computerized collaboration space being monitored, wherein said collaboration space comprises at least one site within a computerized network accessible by a plurality of computerized devices,
    receiving a user-selectable identification of events of interest with respect to said collaboration space;
    automatically monitoring collaborator interaction with said collaboration space to identify occurrences of said events of interest using at least one of said computerized devices;
    automatically recording a chronicle of activities that transpire within said collaboration space to produce at least one report of minutes of at least one meeting occurring within said collaboration space based on said occurrences of said events of interest over a predetermined time period using at least one of said computerized devices, said report of minutes summarizing occurrences of said events of interest;
    receiving a query regarding said occurrences of said events;
    searching said occurrences of said events to produce a response to said query; and
    outputting said response to said query,
    wherein said events of interest comprise:
        an identity of collaborators that interact with said collaboration space;
        times and dates of when said collaborators begin using and stop using said collaboration space; and
        topical subjects of collaborator interaction.

5. The method according to claim 4, further comprising identifying a time period for said monitoring to occur.

6. The method according to claim 4, wherein said events of interest comprise a number and identity of collaborators attending a virtual meeting through said collaboration space, wherein said virtual meeting comprises at least two of said collaborators simultaneously accessing said collaboration space and interacting with other collaborators through said collaboration space, using different computerized devices.

7. A method comprising:
    receiving an identification of a computerized collaboration space being monitored, wherein said collaboration space comprises a virtual space accessible only through a computerized device and comprises at least one site within a computerized network accessible by a plurality of computerized devices, wherein said collaboration space is shared by at least two collaborators who interact with said collaboration space to view, add, remove, and revise items maintained within said collaboration space, and wherein said items comprise at least one of documents, graphic items, image items, video items, and audio items;
    receiving a user-selectable identification of events of interest with respect to said collaboration space;
    automatically monitoring said items and collaborator interaction with said collaboration space to identify occurrences of said events of interest using at least one of said computerized devices;

automatically recording a chronicle of activities that transpire within said collaboration space to produce at least one report of minutes of at least one meeting occurring within said collaboration space based on said occurrences of said events of interest using at least one of said computerized devices, said report of minutes summarizing occurrences of said events of interest; and outputting said of report of minutes, wherein said events of interest comprise:

an identity of collaborators that interact with said collaboration space;

times and dates of when said collaborators begin using and stop using said collaboration space; and topical subjects of collaborator interaction.

8. The method according to claim 7, further comprising identifying a time period for said monitoring to occur.

9. The method according to claim 7, wherein said events of interest comprise a number and identity of collaborators attending a virtual meeting through said collaboration space, wherein said virtual meeting comprises at least two of said collaborators simultaneously accessing said collaboration space and interacting with other collaborators through said collaboration space, using different computerized devices.

10. A computer-usable data carrier storing instructions that, when executed by a computer, cause the computer to perform a method comprising:

receiving an identification of a computerized collaboration space being monitored, wherein said collaboration space comprises at least one site within a computerized network accessible by a plurality of computerized devices;

receiving a user-selectable identification of events of interest with respect to said collaboration space;

automatically monitoring collaborator interaction with said collaboration space to identify occurrences of said events of interest;

automatically recording a chronicle of activities that transpire within said collaboration space to produce at least one report of minutes of at least one meeting occurring within said collaboration space based on said occurrences of said events of interest, said report of minutes summarizing occurrences of said events of interest; and outputting said of report of minutes, wherein said events of interest comprise:

an identity of collaborators that interact with said collaboration space;

times and dates of when said collaborators begin using and stop using said collaboration space; and topical subjects of collaborator interaction.

11. The computer-usable data carrier storing instructions that, when executed by a computer causes the computer to perform the method according to claim 10, further comprising identifying a time period for said monitoring to occur.

12. The computer-usable data carrier storing instructions that, when executed by a computer causes the computer to perform the method according to claim 10, wherein said events of interest comprise a number and identity of collaborators attending a virtual meeting through said collaboration space, wherein said virtual meeting comprises at least two of said collaborators simultaneously accessing said collaboration space and interacting with other collaborators through said collaboration space, using different computerized devices.

* * * * *